United States Patent
Tiirola et al.

(10) Patent No.: US 12,058,080 B2
(45) Date of Patent: Aug. 6, 2024

(54) SCHEDULING AND SIGNALLING COMMUNICATION RESOURCES

(71) Applicant: Nokia Technologies Oy, Espoo (FI)

(72) Inventors: Esa Tiirola, Kempele (FI); Kari Hooli, Oulu (FI); Kari Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 295 days.

(21) Appl. No.: 17/773,802

(22) PCT Filed: Sep. 22, 2020

(86) PCT No.: PCT/EP2020/076382
§ 371 (c)(1),
(2) Date: May 2, 2022

(87) PCT Pub. No.: WO2021/099008
PCT Pub. Date: May 27, 2021

(65) Prior Publication Data
US 2022/0393842 A1    Dec. 8, 2022

Related U.S. Application Data

(60) Provisional application No. 62/938,577, filed on Nov. 21, 2019.

(51) Int. Cl.
*H04L 27/26* (2006.01)
*H04L 5/00* (2006.01)

(52) U.S. Cl.
CPC ...... *H04L 5/0094* (2013.01); *H04L 27/26025* (2021.01); *H04L 27/261* (2013.01)

(58) Field of Classification Search
CPC ........... H04L 27/2602; H04L 27/26025; H04L 27/261; H04L 5/003; H04L 5/0094
See application file for complete search history.

(56) References Cited

U.S. PATENT DOCUMENTS

| 9,820,281 | B1 | 11/2017 | Werner et al. |
| 2017/0311315 | A1 | 10/2017 | Islam et al. |
| 2017/0325250 | A1* | 11/2017 | Manolakos ........... H04W 72/12 |
| 2018/0343673 | A1 | 11/2018 | Chen et al. |
| 2019/0052419 | A1 | 2/2019 | Yang et al. |

FOREIGN PATENT DOCUMENTS

| EP | 3282623 A1 | 2/2018 |
| EP | 3416327 A1 | 12/2018 |

(Continued)

OTHER PUBLICATIONS

"5G/NR—Frame Structure", ShareTechNote, Retrieved on May 5, 2022, Webpage available at : https://www.sharetechnote.com/html/5G/5G_FrameStructure.html.

(Continued)

*Primary Examiner* — Melvin C Marcelo
*Assistant Examiner* — Natali Pascual Peguero
(74) *Attorney, Agent, or Firm* — Nokia Technologies Oy

(57) ABSTRACT

This document discloses a solution for scheduling communication resources. According to an aspect, a method comprises: storing, in a memory, a mapping database defining translation specifications between a first resource space and a second resource space, wherein the first resource space is based on at least a first sub-carrier spacing and the second resource space is based on at least a second sub-carrier spacing different from the first sub-carrier spacing; receiving, from a second network node of the wireless network, a scheduling message defining communication resources in the first resource space; translating the communication resources of the first resource space into communication resources of the second resource space by using the mapping database; and communicating a message with the second network node in the communication resources of the second resource space.

20 Claims, 6 Drawing Sheets

(56) References Cited

FOREIGN PATENT DOCUMENTS

| WO | 2017/123045 A1 | 7/2017 |
|----|----------------|--------|
| WO | 2017/217903 A1 | 12/2017 |
| WO | 2018/059407 A1 | 4/2018 |
| WO | 2018/175577 A1 | 9/2018 |
| WO | 2018/185093 A1 | 10/2018 |
| WO | 2021/047749 A1 | 3/2021 |

OTHER PUBLICATIONS

"3rd Generation Partnership Project; Technical Specification Group Radio Access Network; NR; Physical channels and modulation (Release 15)", 3GPP TS 38.211, V15.6.0, Jun. 2019, pp. 1-97.

"New SID on NR waveform beyond 52.6GHZ", 3GPP TSG RAN Meeting #79, RP-180453, Agenda: 9.1.2, Qualcomm, Mar. 19-22, 2019, 4 pages.

"New SID: Study on NR design above 52.6GHz", 3GPP TSG RAN Meeting #79, RP-180320, Agenda: 9.1.2, Intel Corporation, Mar. 19-22, 2018, 4 pages.

"3rd Generation Partnership Project; Technical Specification Group Radio Access Network; NR; Physical layer procedures for control (Release 15)", 3GPP TS 38.213, V15.2.0, Jun. 2018, pp. 1-99.

International Search Report and Written Opinion received for corresponding Patent Cooperation Treaty Application No. PCT/EP2020/076382, dated Dec. 7, 2020, 14 pages.

"Beyond 52.6 GHz Study Objectives", 3GPP TSG RAN Meeting #85, RP-192140, Agenda: 8.2.2, Nokia, Sep. 16-20, 2019, pp. 1-24.

Office action received for corresponding European Patent Application No. 20776133.9, dated May 31, 2023, 11 pages.

\* cited by examiner

SCHEDULING AND SIGNALLING COMMUNICATION RESOURCES

RELATED APPLICATION

This application was originally filed as a Patent Cooperation Treaty Application No. PCT/EP2020/076382 filed on Sep. 22, 2020, which claims priority from U.S. Provisional Patent Application No. 62/938,577 filed on Nov. 21, 2019, which is hereby incorporated in its entirety.

FIELD

Various embodiments described herein relate to the field of wireless communications and, particularly, to scheduling communication resources and signalling the scheduled communication resources.

BACKGROUND

With the development of new wireless network and their specifications, higher frequency bands are taken into use. Transmissions on higher frequency bands are typically subject to several types of impairments that are not as dominant on lower frequency bands. For example, increased noise and/or interference may be caused by increased radio path losses and less efficient transceiver components.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
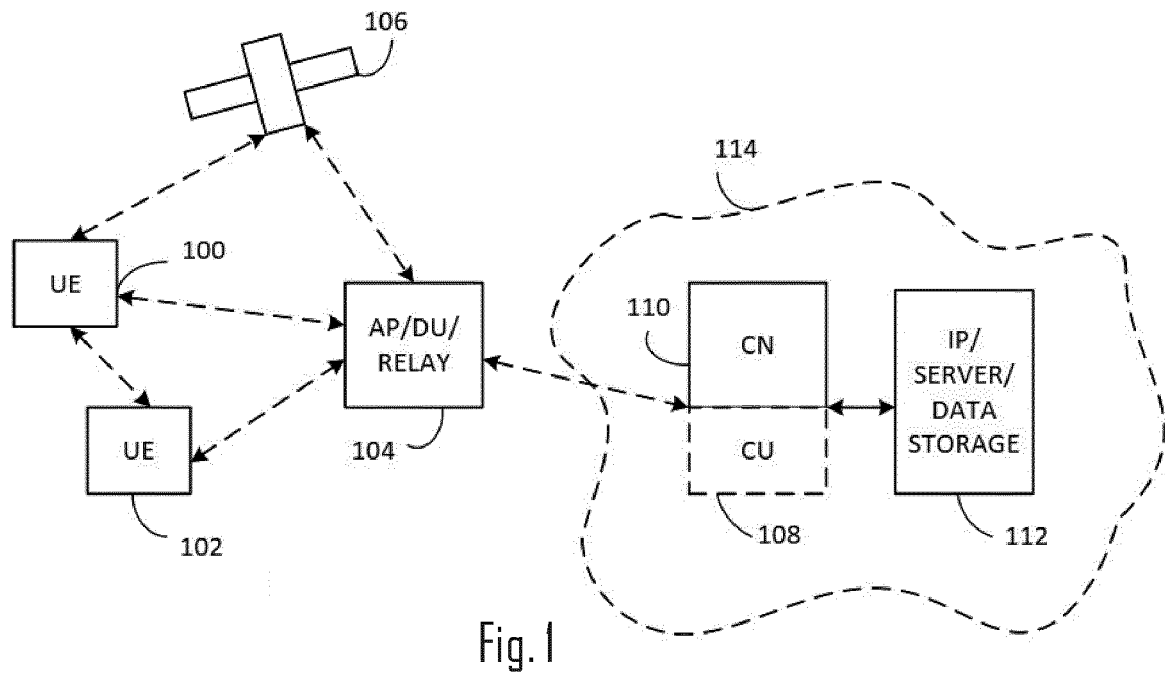

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is an integrated access and backhaul (IAB) node, a self-backhauling relay node in some literature. Another example of relaying is out-band relay. The IAB node may comprise two parts: a distributed unit (DU) that facilitates the gNB functionalities and a mobile termination (MT) unit that facilitates UE functionalities. A backhaul link is a communication link between a the IAB node and an access node such as a gNB or a distributed unit of the gNB. In some references, the MT is called IAB-UE. UE functionalities can be performed also by the MT part of the IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF)

and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Many modern wireless networks are based on multi-carrier transmission where a signal is distributed to a set of sub-carriers comprised in the same symbol that is transmitted from a transmitter to a receiver. Term sub-carrier can used also in the context of a single carrier transmission. For example, single carrier signals, such as a discrete Fourier transform spread orthogonal frequency division multiplexing (DFT-S-OFDM) signal employed in 5G, for example, can be generated based on frequency domain processing. Hence, the term sub-carrier (or virtual sub-carrier) may be relevant also for different scenarios with single-carrier transmission. Sub-carriers are spaced from each other in a frequency domain. 3GPP specifications for the NR define so-called transmission numerologies that define different resource spaces in terms of sub-carrier spacings. Table 1 below illustrates some transmission numerologies supported by NR:

TABLE 1

| μ | $\Delta f = 2^\mu \cdot 15$ [kHz] |
|---|---|
| 0 | 15 |
| 1 | 30 |
| 2 | 60 |
| 3 | 120 |
| 4 | 240 |
| 5 | *480* |
| 6 | *960* |
| 7 | *1920* |
| 8 | *3840* |

The transmission numerologies denoted in Italic in Table 1 illustrate future proposals. μ is a scaling factor defining the scaling for the different numerologies. Higher numerologies having the higher scaling factor may be assigned to higher operating frequencies. For example, numerologies having scaling factor from 4 to 8 may be suitable for operating frequencies above 52.6 Gigahertz (GHz) while the lower numerologies may be suitable for operating frequencies below the 52.6 GHz. However, this division is merely one example. For a given Fourier transform (FFT) size (such as 4 k FFT), the subcarrier spacing defines also the maximum size of the bandwidth part and/or carrier.

Larger sub-carrier spacing (higher scaling factor) shortens the (OFDM/SC-) symbol duration and may improve tolerance to phase noise, for example. On the other hand, it employs a higher carrier bandwidth. When the operating frequency band increases, the phase noise also increases which calls for increasing the sub-carrier spacing, e.g. to scaling factors 5 to 8. A drawback caused by the increase is that the symbol duration further reduces. Current scheduling procedures are based on a certain time interval between a scheduling command and the scheduled resource, and the time interval may be counted in symbols or time slots. With the reduced symbol duration, the time interval may reduce to such degree that the receiver of the scheduling command has no time to receive and process the scheduling command before the scheduled resource occurs. Reduced symbol duration results in that the received signal energy also reduces when transmission power remains constant. This may result in scheduling and coverage problems.

Figure 2:
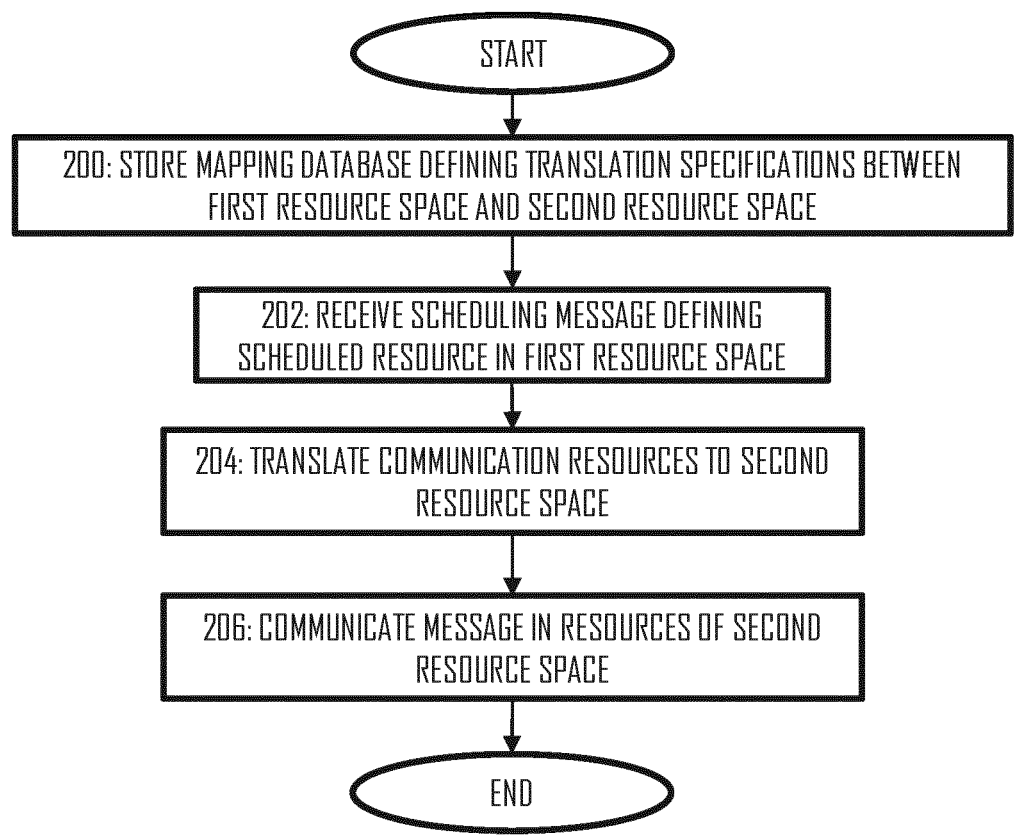
FIGS. 2 and 3 illustrate embodiments of processes for scheduling resources in a first resource space and transmitting a message in a second resource space.
Figure 3:
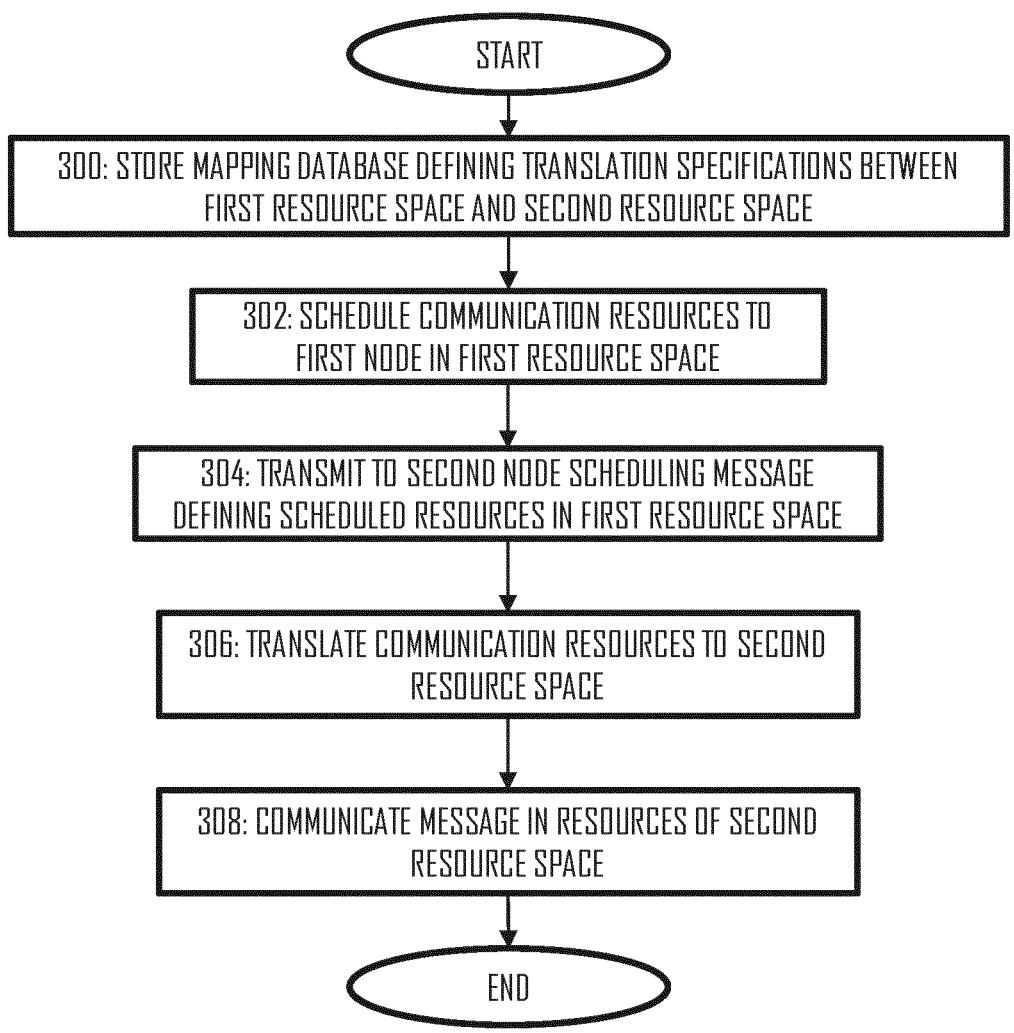

FIGS. 2 and 3 illustrate procedures for scheduling communication resources according to some embodiments of the invention. FIG. 2 illustrates a procedure from the perspective of the terminal device 100, 102 while FIG. 3 illustrates a procedure from the perspective of an access node 104 or a peer device. The procedures are equally applicable to the links between the terminal device 100 or 102 and the access node, to IAB scenarios, and to sidelinks or device-to-device links established directly between the terminal devices 100, 102 (see arrow between the terminal devices in FIG. 1).

Referring to FIG. 2, the procedure comprises as performed by a first network node, e.g. the terminal device 100 or MT of an IAB node: storing (block 200), in a memory, a mapping database defining translation specifications between a first resource space and a second resource space, wherein the first resource space is based on at least a first sub-carrier spacing and the second resource space is based on at least a second sub-carrier spacing different from the first sub-carrier spacing; receiving (block 202), from a second network node of the wireless network, a scheduling message defining communication resources in the first resource space; translating (block 204) the communication resources of the first resource space into communication resources of the second resource space by using the mapping database; and communicating (block 206) a message with the second network node in the communication resources of the second resource space.

Referring to FIG. 3, the procedure comprises as performed by the second network node, e.g. the terminal device 102 or the access node 104: storing (block 300), in a memory, a mapping database defining translation specifications between a first resource space and a second resource space, wherein the first resource space is based on at least a first sub-carrier spacing and the second resource space is based on at least a second sub-carrier spacing different from the first sub-carrier spacing; scheduling (block 302) communication resources to the first network node of the wireless network, wherein the scheduled communication resources are defined in the first resource space; transmitting (block 304), to the first network node, a scheduling message defining the communication resources in the first resource space; translating (block 306) the communication resources of the first resource space into communication resources of the second resource space by using the mapping database; and communicating (block 308) a message with the first network node in communication resources of the second resource space.

The message communicated between the network nodes in blocks 206 and 308 may be an uplink message transmitted from the first network node to the second network node or a downlink message transmitted from the second network node to the first network node. In other words, the embodiment is suitable for both uplink, downlink, and sidelink communications in a straightforward manner.

The order of blocks may vary in different embodiments. For example, the second network node may perform the translation in block 306 before the transmission of the scheduling message in block 304.

The embodiments of FIGS. 2 and 3 provide an advantage that the second network node may perform the scheduling in the first resource space. The second network node may thus use the scheduling principles applicable to the first resource space and still perform scheduling of communication resources to the second resource space. For example, in the case where the first resource space is comprised in the lower numerologies of Table 1, the scheduler may apply the scheduling principles of current 3GPP specifications. Therefore, the scheduler needs not concern of the reduced symbol duration, and increasing the numerologies to higher sub-carrier spacings has a reduced impact on a need to change the scheduling principles, e.g. the time interval between the scheduling command and the scheduled resource. Another advantage is the capability of employing the higher numerologies, thus enabling reduction of the phase noise, for example. From a perspective, an advantage is that the resistance to the phase noise (benefit of a large sub-carrier spacing) and the sufficiently long processing interval (an advantage of the long symbol duration of a small sub-carrier spacing) can be achieved concurrently. By defining the scheduled resources in the different resource space than where the message is transmitted, benefits of both resource spaces may be achieved. For example, if the first resource space is the common resource space for defining the scheduled communication resources for multiple (e.g. lower) sub-carrier spacings, common benefits such as flexibility in scheduling various or numerous resources may be achieved.

From yet another perspective, the scheduling message itself may be transmitted by using the first resource space or another resource space, e.g. it may be irrelevant in determining the communication resources of the second resource space which resource space is used in the actual transmission of the scheduling message. The scheduling message may comprise one or more information elements that explicitly define the scheduled communication resources in the first resource space, e.g. a time-frequency resource in the first resource space, as described in greater detail below.

In an embodiment, the first sub-carrier spacing is smaller than the second sub-carrier spacing. In other words, the scheduler performs the scheduling by using the resource space having the smaller sub-carrier spacing while the communication resources where the message is transmitted have a higher sub-carrier spacing. Since the first sub-carrier spacing is smaller than the second sub-carrier spacing, a time-frequency resource unit in the communication resources of the second resource space defines a larger bandwidth and a smaller time duration than a time-frequency resource unit in the communication resources of the first resource space. The time duration may refer to symbol duration and/or duration of a time slot.

In an embodiment, the first resource space comprises one or more numerologies of Table 1 while the second resource space comprises one or more other numerologies of Table 1 such that the numerologies comprised in the first resource space and the numerologies comprised in the second resource space are mutually exclusive.

In an embodiment, the first resource space complies with R15 reference numerology of 3GPP specifications, wherein the R15 reference numerology supports numerologies up to 120 kHz sub-carrier spacing (240 kHz spacing for synchronization signals and a physical broadcast channel). The second resource space may then comprise one or more numerologies above 240 kHz spacing, or above 120 kHz spacing.

In an embodiment, the communication resources of the first resource space and the communication resources of the second resource space define (substantially) the same bandwidth and (substantially) the same time duration with respect to one another.

In an embodiment, the translation specifications specify, for each time-frequency resource in the communication resources of the first resource space, a corresponding time-frequency resource in the second resource space.

In an embodiment, the translation specifications specify how the communication resources of the second resource space form a different time-frequency pattern than the communication resources of the first resource space. The time-frequency pattern may be defined in terms of a number of frequency resource blocks and a number of time units such as (OFDM/single-carrier FDM (SC-FDM)) symbols or a group of symbols (a.k.a. as mini-slots), or time slots. The communication resources of the first resource space where the communication resource is scheduled may have a first number of scheduled frequency resource blocks and a first number of scheduled time units, while the resources of the second resource space where the message is transmitted/received may have a second number of scheduled frequency resource blocks and a second number of scheduled time units, differing from those of the first resource space.

Figure 4:
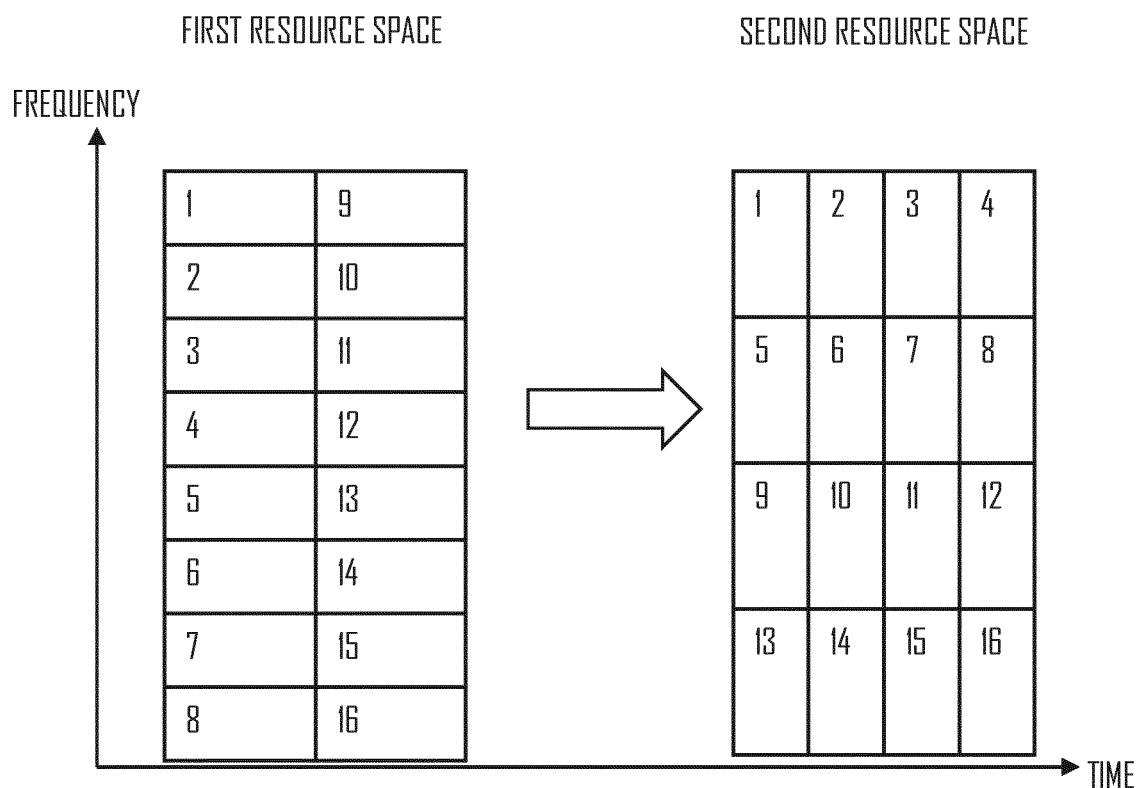
FIG. 4 illustrates mapping between the resource spaces according to an embodiment.

FIG. 4 illustrates the difference between the resource spaces and, additionally, an embodiment of the translation specifications. FIG. 4 illustrates an example of the scheduled communication resources in the first resource space and the communication resources of the second resource space after the translations in blocks 204 and 306. The communication resources are drawn substantially on the same scale to illustrate an embodiment where the communication resources of the first resource space and the communication resources of the second resource space consume the same amount of time-frequency resources. The time-frequency resources can be counted in units of physical resource blocks including a predefined number of sub-carriers per symbol duration. Another option is to count them directly as resource elements (one resource element being a sub-carrier in frequency, and an OFDM/SC-FDM symbol in time) The time-frequency patterns differ, as defined by the translation specifications.

Referring to FIG. 4, the scheduled time-frequency resources consist of eight sub-carriers and two time units (symbols or time slots), resulting in 16 resource units. The communication resources in the second resource space have the same number of 16 resource units, but arranged according to a different time-frequency pattern: four sub-carriers and four time units. Accordingly, the communication resources of the first resource space comprise a lower number of time units than the communication resources of the second resource space and, additionally, the communication resources of the first resource space comprise a higher number of frequency resource units than the communication resources of the second resource space. In this example, the bandwidth and the duration of the scheduled resource may remain the same in both resource spaces but, if specified differently by the translation specifications, the communication resources of the second resource space may consume a wider bandwidth and a smaller duration (or a smaller bandwidth and longer duration) than the communication resources in the first resource space.

In FIG. 4, the translation specifications specify a translation scheme where the communication resources of the first resource space are read each time unit at a time and in the order of decreasing frequency resource, and translated to the second resource space in the order of filling each frequency at a time, and in the order of increasing OFDM symbol and/or time slot index. The numbering in the resource units illustrates where each time-frequency block of the first resource space is mapped in the second resource space. Obviously, other translation schemes would be equally applicable, e.g. one that follows the same principle in reading and writing. What matter is that both the transmitter and the receiver use the same translation specifications in blocks 204 and 306 and, accordingly, have a common understanding of the resource units in the second resource space where the transmission and reception of the message is performed.

In an embodiment, the message communicated in blocks 206 and 308 comprises a first signal and a second signal, and the translation specifications apply to the first signal but not to the second signal. In other words, the first signal may be transmitted and received in the communication resources of the second resource space (with the second sub-carrier spacing), while the second signal is transmitted and received in the communication resources of the first resource space (with the first sub-carrier spacing). In other words, the translation in blocks 204 and 306 is performed for the first signal but not for the second signal.

In an embodiment, the first signal is a data signal. In an embodiment, the second signal is a control signal or a reference signal. In an embodiment, the first signal is a data signal and the second signal is a control signal. The control signal may be, for example, a signal of a physical downlink control channel (PDCCH) or a physical uplink control channel (PUCCH). The data signal may be, for example a signal of a physical downlink shared channel (PDSCH), or a signal of a physical uplink shared channel (PUSCH). A reference signal may be such as a demodulation reference signal (DMRS), or a sounding reference signal, or a channel-state information reference signal (CSI-RS).

In an embodiment, the translation specifications are applied to a subset of channels. For example, the translation specifications may be applied to a data channels but not for a control channels. In another embodiment, the translation specifications are applied only to a downlink data channel but not to an uplink data channel and not to any control channels.

Figure 5:
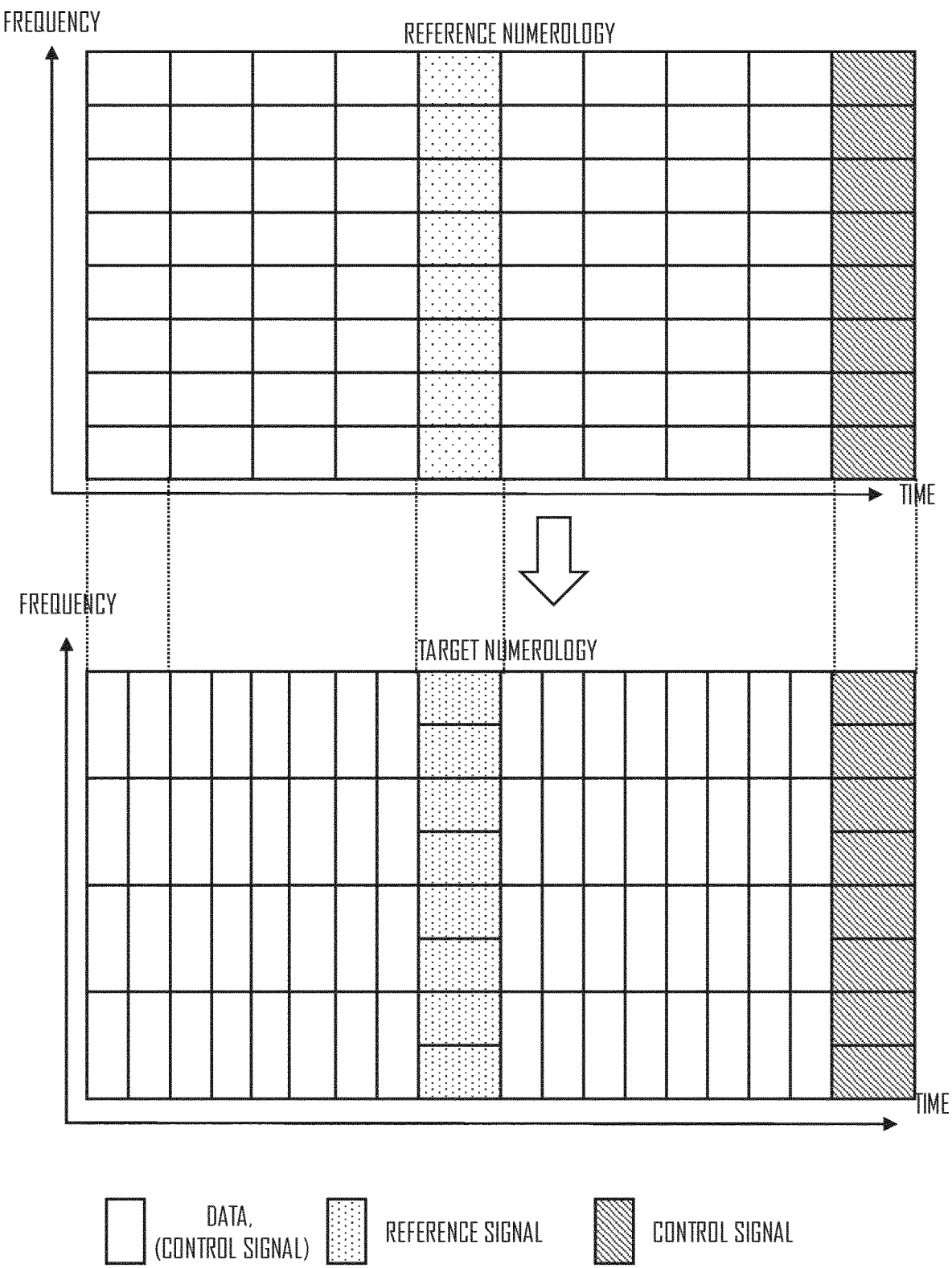
FIG. 5 illustrates mapping between the resource spaces according to another embodiment where the mapping is applied to a subset of signals.

FIG. 5 illustrates an embodiment illustrating the embodiments where the translation from the first resource space to the second resource space is performed for a subset of signals communicated in blocks 206 and 308. FIG. 5 illustrates a set of scheduled communication resource defined in the first resource space, e.g. by using a reference numerology, and the set of scheduled communication resources as translated into the second resource space, e.g. a target numerology. Resources denoted by different pattern represent different signals allocated to said resources. As can be seen in FIG. 5, the data for example is translated from the reference numerology to the target numerology, thus forming a different time-frequency pattern for the data resources in the target numerology. However, control signals such as the reference signal is maintained in the first numerology. In the embodiment of FIG. 5, the timing of the control signal(s) is maintained, i.e. the transmission/reception of the reference signal and the other control signal occurs at the same time interval, as illustrated by the dotted lines between the two resource spaces.

In another embodiment, the translation specifications may specify a different timing for the control signal(s).

Time-frequency resources of some control signals may be translated into the second resource space in the same manner as the data resources.

In an embodiment, the mapping database stores different translation specifications for different operative frequency bands, and the processes of FIGS. 2 and 3 may include determining the translation specifications on the basis of a frequency band used for communicating with the other network node. The different resource spaces may have been mapped to the different operating frequencies and, accordingly, different translation specifications may be associated with the different operating frequencies. For example, a certain frequency band may utilize the numerology having the scaling factor of 6 (see Table 1) while another frequency band may utilize the numerology having the scaling factor of 7. As a consequence, the translation specifications may differ. The mapping between the operating frequency band and the corresponding translation specifications may be fixed and, as a consequence, each network node may determine the same translation specifications upon selecting the operating frequency band for use in the communication therebetween. Certain frequency bands may support multiple numerologies. Each numerology option for the second numerology may be associated to specific translation specifications.

In another embodiment, the mapping database stores different translation specifications for different resource spaces used as the first resource space. For example, different numerologies employed in the scheduling may require different translation specifications. The processes of FIGS. 2 and 3 may include determining the translation specifications on the basis of the first resource space used in the scheduling to define the scheduled communication resources.

In another embodiment, the mapping database stores different translation specifications for different resource spaces used as the second resource space. For example, different numerologies employed in the transmission of the message (block 206/308) may require different translation specifications. The processes of FIGS. 2 and 3 may include determining the translation specifications on the basis of the second resource space used in the transmission of the message in the scheduled communication resources to define the scheduled communication resources.

In other embodiments, other predefined rules may be stored in the mapping database to select one of multiple translation specifications stored in the mapping database.

Figure 6:
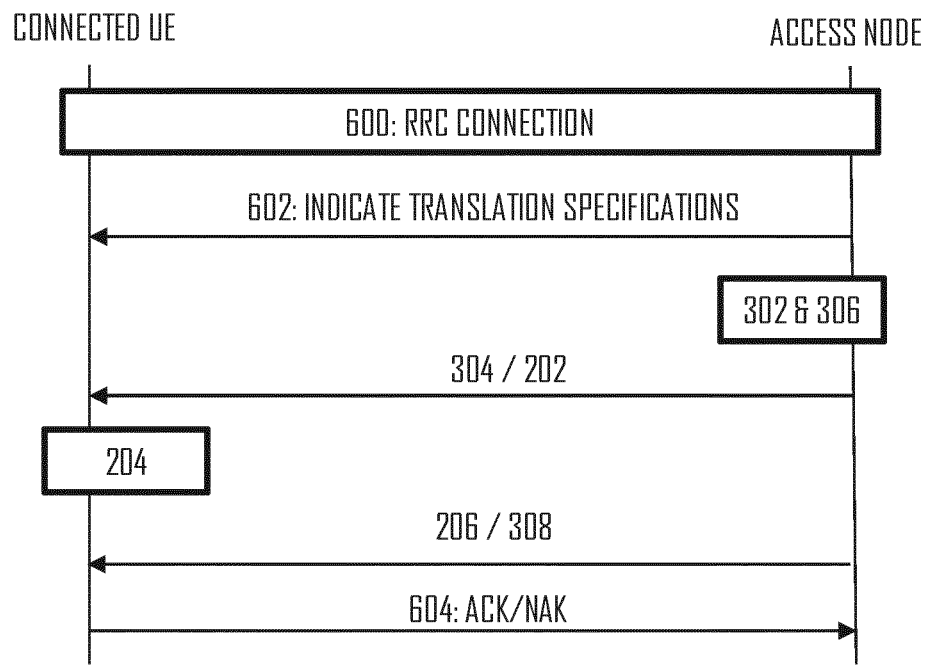
FIG. 6 illustrates a signalling diagram combining the embodiments of FIGS. 2 and 3.

In an embodiment, the apparatus performing the process of FIG. 2 receives the translation specifications from the network node performing the process of FIG. 3. For example, the access node 104 may broadcast an information element indicating the translation specifications. The information element may comprise an index to the mapping database specifying different sets of translation specifications for different target resource spaces representing the second resource space in the embodiments of FIGS. 2 and 3, e.g. the target numerologies. In another embodiment, the access node 104 or the network node performing the process of FIG. 3 indicates the translation specifications in a unicast message or a multicast message, e.g. a radio resource control (RRC) message. FIG. 6 illustrates an embodiment where the access node indicates the translation specifications.

Referring to FIG. 6, the terminal device 100 and the access node 104 may perform an RRC connection setup in block 600. In block 602, the access node indicates the translation specifications to the terminal device, e.g. as downlink control information (DCI) or in dedicated signalling (e.g. RRC). Upon receiving the translation specifications in step 602, the terminal device may store the translation specifications in the mapping database stored in the terminal device. Thereafter, the devices may perform the steps of FIGS. 2 and 3, as illustrated in FIG. 6. In this embodiment, the message is a downlink message transmitted by the access node and received by the terminal device in steps 206 and 308 in the scheduled communication resources that have been translated into the second resource space. The terminal device may then respond to the message by transmitting an acknowledgment message (ACK/NAK) in step 604, thereby indicating correct/unsuccessful reception of the message. The acknowledgment message may be transmitted in the first resource space or in the second resource space, depending on the embodiment. The acknowledgment message may be considered as an example of the above-described control signal.

Figure 7:
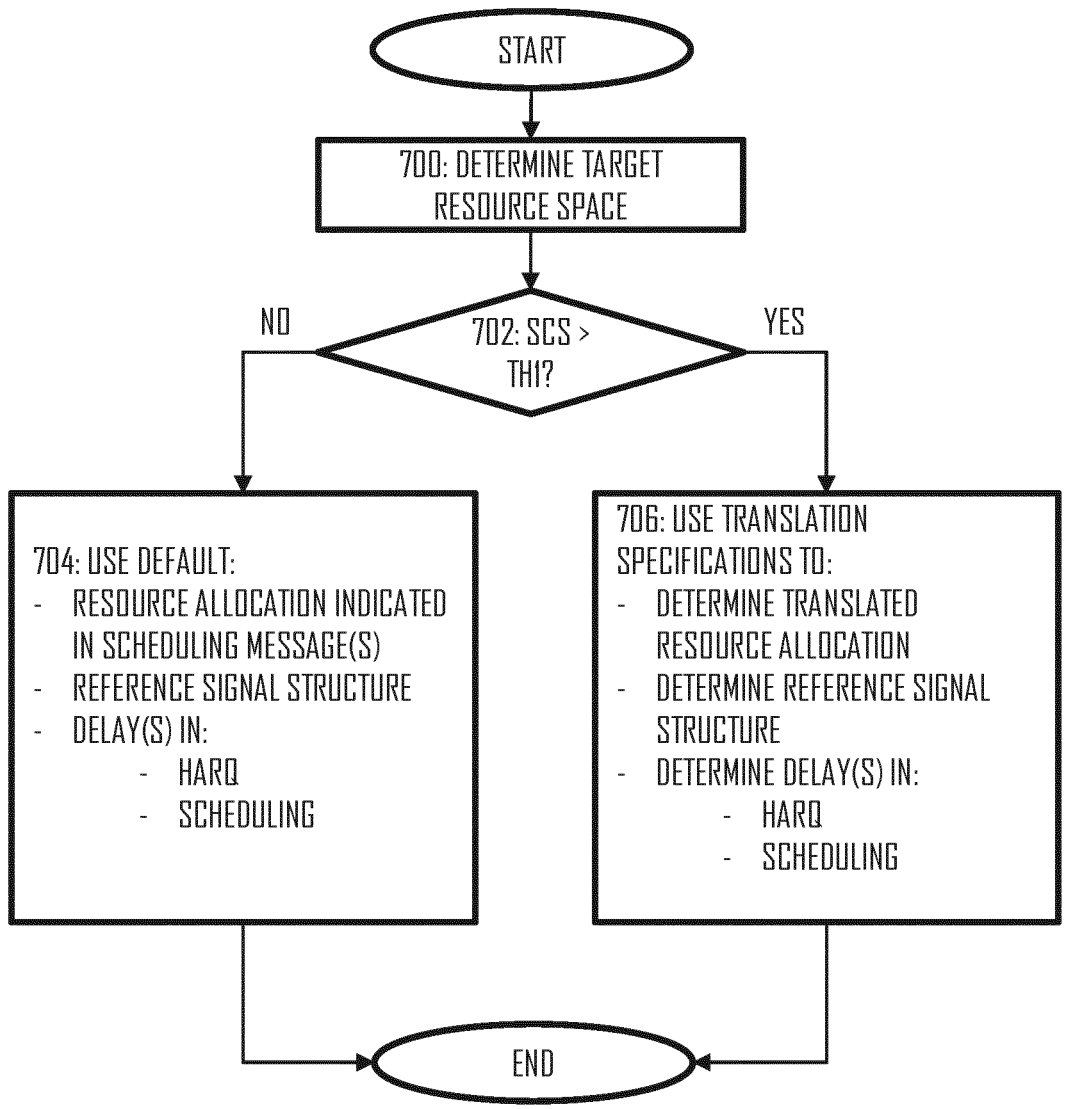
FIG. 7 illustrates an embodiment of a process for determining whether or not to apply translation between resource spaces.

In an embodiment, the activation of the translation specifications may be determined on the basis of the resource space to be used in the communication between the network nodes. Some resource spaces (e.g. numerologies) may need no translation while other resource spaces may require the translation in order to meet the above-described advantages. For example, the numerologies up to the scaling factor 3 or 4 of Table 1 may require no translation while the numerologies from 4 or 5 upwards may require the translation. Therefore, the network nodes may determine the target resource space (e.g. the sub-carrier spacing) in which the message shall be transmitted and, on that basis, determine whether or not to enable the translation. If the translation is enabled, the network nodes may further determine the translation specifications, as described above. Different target resource spaces requiring the translation may employ different translation specifications. FIG. 7 illustrates an embodiment of a process for determining whether or not the translation is required, and some embodiments of parameters affected by the translation (block 706 of FIG. 7). The process of FIG. 7 may be an embodiment of the process of FIG. 2 and/or an embodiment of the process of FIG. 3. Accordingly, the process may be performed by any one or both of the network nodes.

Referring to FIG. 7, the network node determines the target resource space in block 700, wherein the target resource space (e.g. a target numerology) may be understood as the resource space where the message is transmitted in the scheduled communication resources (the second resource space). This may be determined separately for different signals and/or channels. The target resource space may be determined on the basis of the operating frequency of the communication between the network nodes, on the basis of resource space(s) employed in the communication between the network nodes, on the basis of a control signal received from the other network node, e.g. from the access node, or another criterion. One example of another criterion is channel conditions determined on the basis of a measured path loss, a received signal strength indicator (RSSI), or a similar metric. In block 702, a decision is made whether or not the target resource space triggers the use of the translation between the scheduled resources and the target resources where the message(s) is/are transmitted. Block 702 may comprise determining the scaling factor of the target numerology, for example. If the scaling factor or, in general, the sub-carrier spacing is above a threshold, the translation may be triggered and the process proceeds to block 706. If the translation shall not be triggered, e.g. the scaling factor or the sub-carrier spacing is below the threshold, the process may proceed to block 704.

In block 704, default parameters are used. For example, the scheduled communication resources of the first resource space may be used as such, even though the target resource space differs from the first resource space. If it is determined that the target resource space is still close enough to the first resource space, no problems mentioned above exist and no translation is required. Default signalling structured etc. may also be applied.

In block 706, the network node may select the translation specifications associated with the target resource space. The selected translation specifications may then be used as described in the embodiments above. For example, the translation specifications may be used for mapping the scheduled communication resources to the target resource space, as described above. The translation specifications may be used for other purposes as well, e.g. to determine the time-frequency resources for the control signals. As described in connection with FIG. 5, time-frequency resources of some control signals may be translated to the target resource space while time-frequency resources of other control signals may be maintained in the first resource space, e.g. the (demodulation) reference signal. Accordingly, block 706 may comprise determining locations of (demodulation) reference signals in the target resource space on the basis of the translation specifications, upon receiving the scheduling message.

The translation specifications may also specify a delay in the second resource space. The delay may be a delay of a hybrid automatic repeat request (HARQ) procedure. The HARQ procedure may define different types of delays. One example of such a delay is a delay between a downlink scheduling grant (message scheduling a downlink communication resource) and corresponding downlink data (the communication resource scheduled by the downlink scheduling grant) on a physical downlink shared channel (PDSCH). This delay is denoted by K0 in 3GPP specifications. Another type of delay is a delay between the downlink data (the communication resource scheduled by the scheduling grant) and an uplink resource for a corresponding acknowledgment message (ACK/NAK). This delay is denoted by K1 in the 3GPP specifications. Yet another delay is a delay between reception of an uplink scheduling grant (message scheduling an uplink communication resource) and corresponding uplink data (the communication resource scheduled by the uplink scheduling grant). This delay is denoted by K2 in the 3GPP specifications. The delays may be defined in terms of time slots or symbols or time slots and symbols, for example. Other forms of the processing delay or another delay may also be affected by the target resource space and the corresponding translation specifications. The delay may be otherwise related to a (minimum) processing time required for receiving the message and processing the received message, either in uplink or downlink or in both.

As described above, the translation specifications may define a structure for a control signal in the communicated message. For example, a sufficient density of the (demodulation) reference signal may be required when the sub-carrier spacing is high and, accordingly, the translation specifications may specify additional reference signal symbols per time slot. Alternatively, or additionally, the translation specifications may specify a time-frequency resource for the reference signal in a higher number of symbols than in the first resource space, e.g. each symbol may comprise a frequency resource block for the reference signal. Without the translation, the amount of reference signal symbols may be lower. In another embodiment, the translation of the time-frequency resources of the reference signal may be performed in the same manner as for the date, i.e. changing the time-frequency pattern of the time-frequency resources of the reference signal. However, a different demodulation reference signal sequence may be selected for the second resource space than for the first resource space. A dedicated set of reference signal sequences may be provided for the resource spaces having the higher sub-carrier spacing, for example. This may allow optimization of properties of the reference signals for high sub-carrier spacings, e.g. a peak-to-average power ratio.

In yet another embodiment, a transport block size is determined on the basis of the first resource space. The access node may indicate the transport block size in the first resource space, for example, and the translation specifications or the mapping database in general may specify the translation of that transport block size to the second resource space.

Figure 8:
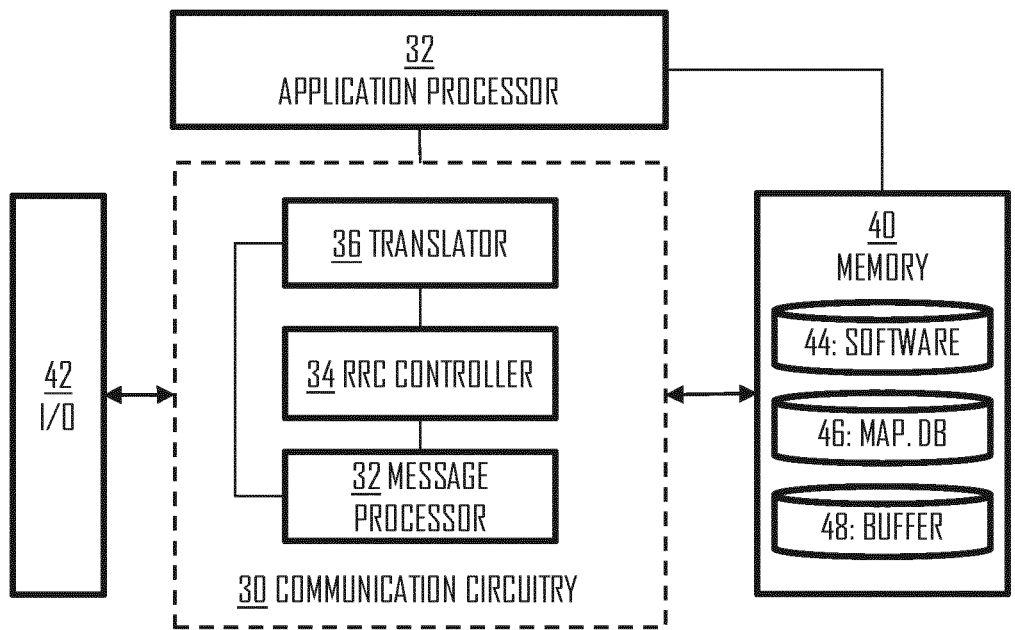
FIGS. 8 and 9 illustrate block diagrams of structures of apparatuses according to some embodiments of the invention.

FIG. 8 illustrates an embodiment of a structure of the above-mentioned functionalities of an apparatus executing the functions of the network node executing the process of FIG. 2 or any one of its embodiments, e.g. the terminal device 100. The terminal device may be a terminal device, a peer device, or a client device of a wireless network, e.g. an LTE or 5G based cellular communication network. In other embodiments, the apparatus may be a circuitry or an electronic device realizing some embodiments of the invention in the terminal device. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 8, the apparatus may comprise at least one processor or a processing circuitry comprising a communication circuitry 30 providing the apparatus with capability of communicating in the wireless network of the access node 104. The communication circuitry 30 may employ a communication interface 42 providing the apparatus with radio communication capability. The communication interface 42 may support the signalling and data transmission/reception capabilities described above. The communication interface may support any one or more of the above-described wireless networks. It may comprise radio frequency converters and components such as an amplifier, filter, frequency-converter, (de)modulator, and encoder/decoder circuitries and one or more antennas. The communication circuitry 30 or the communication interface 42 may comprise a radio modem configured to carry out transmission and reception of messages in the wireless network.

The processing circuitry 30 may further comprise a RRC controller 34 managing the connections of the terminal device. The RRC controller 34 may, for example, establish and operate RRC connections established in the terminal device. The RRC controller 34 may also control or carry out the selection of the translation specifications according to any one of the above-described embodiments. The communication circuitry may further comprise a translator circuitry 36 configured to execute block 204, for example. The translator circuitry may thus configured, upon being triggered by the RRC controller to read the scheduled communication resources define in the first resource space in the scheduling message, to translate the communication resources into the second resource space, and output the result of the translation to the communication interface 42 and/or to a message processor 32 such that the appropriate signals are mapped to correct time-frequency resources in the transmission and/or reception. The message processor 32 may be configured to process messages transmitted and received by the apparatus, e.g. the scheduling message and the message communicated in block 206.

The apparatus may further comprise an application processor 32 executing one or more computer program applications that generate a need to transmit and/or receive data through the communication circuitry 30. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

Figure 9:
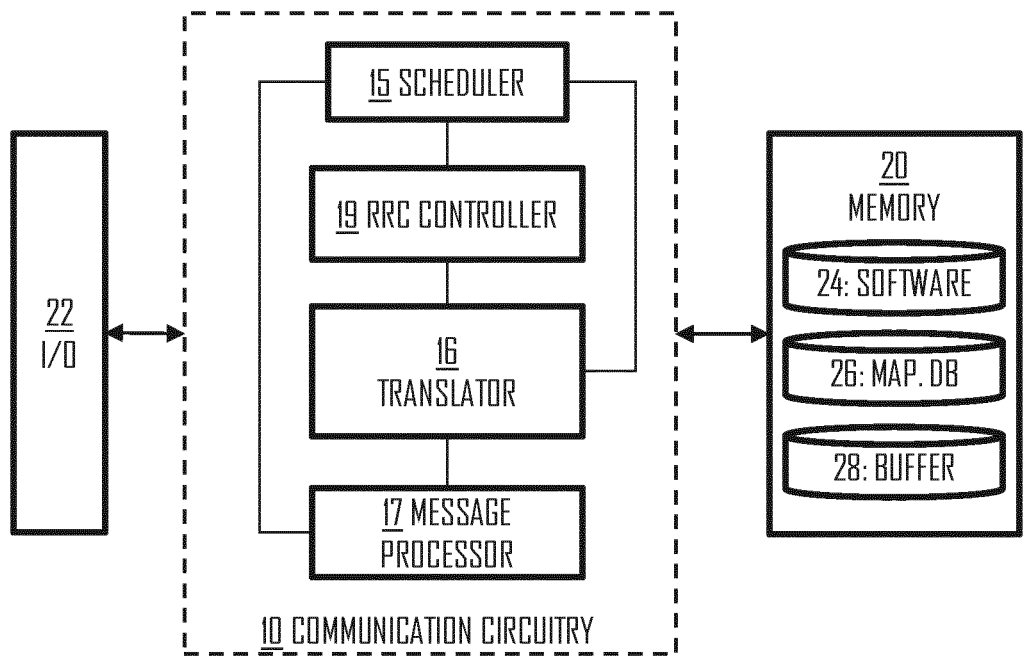

The processing circuitry may comprise at least one processor. The apparatus may further comprise a memory 40 storing one or more computer program products 44 configuring the operation of said processor(s) of the apparatus. The memory 40 may further store a configuration database 46 storing operational configurations of the apparatus. The configuration database 46 may, for example, store the mapping database defining the translation specifications. The memory 40 may further store a data buffer for data waiting for transmission. FIG. 9 illustrates an apparatus comprising a communication circuitry 10, such as at least one processor or processing circuitry, and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the access node (e.g. the gNB), or controller controlling the operation of the access node, or for a terminal device operating according to the embodiment of FIG. 3. The apparatus of FIG. 9 may be an electronic device.

Referring to FIG. 9, the memory 20 may be implemented using any suitable data storage technology, such as semiconductor-based memory devices, flash memory, magnetic memory devices and systems, optical memory devices and systems, fixed memory and removable memory. The memory may comprise a configuration database 26 for storing configuration parameters, e.g. the mapping database storing the translation specifications. The memory 20 may further store a data buffer 28 for data waiting for transmission.

The apparatus may further comprise a communication interface 22 comprising hardware and/or software for realizing communication connectivity according to one or more communication protocols. The communication interface 22 may provide the apparatus with radio communication capabilities in a wireless network. The communication interface may comprise standard well-known analog radio components such as an amplifier, filter, frequency-converter and circuitries, conversion circuitries transforming signals between analog and digital domains, and one or more antennas.

The communication circuitry 10 may comprise an RRC controller 19 configured to manage RRC connections with terminal devices connected to the network node comprising the apparatus. The RRC controller 19 may control the resource spaces employed in the network of the apparatus. The RRC controller may control a scheduler 15 to schedule communication resources in the first resource space, and control a translator circuitry 16 to translate the communication resources scheduled in the first resource space into the second resource space so that a message processor 17 and the communication interface 22 can map the appropriate signals to the correct time-frequency resources in the above-described manner. When no translation is required, the scheduler may indicate the scheduled resources directly to the message processor (for execution of block 308) and to the communication interface (for execution of block 304). When the translation is required, the scheduler 15 may be configured to output the scheduled resources to the translator circuitry (for execution of block 306) and to the communication interface (for execution of block 304).

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 7 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

According to an aspect, there is provided an apparatus for a first network node of a wireless network, comprising means for performing: storing, in a memory, a mapping database defining translation specifications between a first resource space and a second resource space, wherein the first resource space is based on at least a first sub-carrier spacing and the second resource space is based on at least a second sub-carrier spacing different from the first sub-carrier spacing; receiving, from a second network node of the wireless network, a scheduling message defining communication resources in the first resource space; translating the communication resources of the first resource space into communication resources of the second resource space by using the mapping database; and communicating a message with the second network node in the communication resources of the second resource space.

In an embodiment, the first sub-carrier spacing is smaller than the second sub-carrier spacing.

In an embodiment, a time-frequency resource unit in the communication resources of the second resource space defines a larger bandwidth and a smaller time duration than a time-frequency resource unit in the communication resources of the first resource space.

In an embodiment, the communication resources of the first resource space and the communication resources of the second resource space consume the same amount of time-frequency resources.

In an embodiment, the message comprises a first signal and a second signal, wherein the means are configured to: perform said translating for the first signal but not for the second signal, communicate the first signal in the communication resources of the second resource space, and communicate the second signal in communication resources of the first resource space.

In an embodiment, the second signal is a control signal.

In an embodiment, the first signal is a data signal.

In an embodiment, the second signal is a reference signal.

In an embodiment, the means are further configured to receive, from the second network node, at least one parameter indicating the translation specifications.

In an embodiment, the translation specifications specify, for each time-frequency resource in the communication resources of the first resource space, a corresponding time-frequency resource in the second resource space.

In an embodiment, the translation specifications specify how the communication resources of the second resource space form a different time-frequency pattern than the communication resources of the first resource space.

In an embodiment, the means are further configured to determine locations of demodulation reference signals in the second resource space on the basis of the scheduling message and the translation specifications.

In an embodiment, the means are further configured to determine a processing delay in the second resource space on the basis of the scheduling message and the translation specifications.

In an embodiment, the processing delay comprises at least one of the following: a delay of a hybrid automatic repeat request, a scheduling delay and a minimum processing time for a transmitted signal or for a received signal.

In an embodiment, the mapping database stores different translation specifications for different operative frequency bands or for different numerologies, and wherein the means are configured to determine the translation specifications on the basis of a frequency band or an operating numerology used for communicating with the second network node.

According to an aspect, there is provided an apparatus for a first network node of a wireless network, comprising means for performing: storing, in a memory, a mapping database defining translation specifications between a first resource space and a second resource space, wherein the first resource space is based on at least a first sub-carrier spacing and the second resource space is based on at least a second sub-carrier spacing different from the first sub-carrier spacing; scheduling communication resources to a second network node of the wireless network, wherein the scheduled communication resources are defined in the first resource space; transmitting, to the second network node, a scheduling message defining the communication resources in the first resource space; translating the communication resources of the first resource space into communication resources of the second resource space by using the mapping database; and communicating a message with the second network node in communication resources of the second resource space.

In an embodiment, the first sub-carrier spacing is smaller than the second sub-carrier spacing.

In an embodiment, a time-frequency resource unit of the communication resources of the second resource space define a larger bandwidth and a smaller time duration than a time-frequency resource unit of the communication resources of the first resource space.

In an embodiment, the communication resources of the first resource space and the communication resources of the second resource space consume the same amount of time-frequency resources.

In an embodiment, the message comprises a first signal and a second signal, wherein the means are configured to: perform said translating for the first signal but not for the second signal, communicate the first signal in the communication resources of the second resource space, and communicate the second signal in communication resources of the first resource space.

In an embodiment, the second signal is a reference signal.

In an embodiment, the means are further configured to transmit the translation specifications to the second network node.

In an embodiment, the means comprises: at least one processor; and at least one memory including computer program code, the at least one memory and computer program code configured to, with the at least one processor, cause the performance of the apparatus.

According to an aspect, there is provided a method comprising: storing, in a memory by a first network node of a wireless network, a mapping database defining translation specifications between a first resource space and a second resource space, wherein the first resource space is based on at least a first sub-carrier spacing and the second resource space is based on at least a second sub-carrier spacing different from the first sub-carrier spacing; receiving, by the first network node from a second network node of the wireless network, a scheduling message defining communication resources in the first resource space; translating, by the first network node, the communication resources of the first resource space into communication resources of the second resource space by using the mapping database; and communicating, by the first network node, a message with the second network node in the communication resources of the second resource space.

In an embodiment, the first sub-carrier spacing is smaller than the second sub-carrier spacing.

In an embodiment, a time-frequency resource unit of the communication resources of the second resource space define a larger bandwidth and a smaller time duration than a time-frequency resource unit of the communication resources of the first resource space.

In an embodiment, the communication resources of the first resource space and the communication resources of the second resource space consume the same amount of time-frequency resources.

In an embodiment, the message comprises a first signal and a second signal, the method comprising as performed by the first network node: performing said translating for the first signal but not for the second signal, communicating the first signal in the communication resources of the second resource space, and communicating the second signal in communication resources of the first resource space.

In an embodiment, the second signal is a control signal.

In an embodiment, the first signal is a data signal.

In an embodiment, the second signal is a reference signal.

In an embodiment, the first network node receives, from the second network node, at least one parameter indicating the translation specifications. In an embodiment, the translation specifications specify, for each time-frequency resource in the communication resources of the first resource space, a corresponding time-frequency resource in the second resource space.

In an embodiment, the translation specifications specify how the communication resources of the second resource space form a different time-frequency pattern than the communication resources of the first resource space.

In an embodiment, the first network node determines locations of demodulation reference signals in the second resource space on the basis of the scheduling message and the translation specifications.

In an embodiment, the first network node determines a processing delay in the second resource space on the basis of the scheduling message and the translation specifications.

In an embodiment, the processing delay comprises at least one of the following: a delay of a hybrid automatic repeat request, a scheduling delay and a minimum processing time for a transmitted signal or for a received signal.

In an embodiment, the mapping database stores different translation specifications for different operative frequency bands or for different numerologies, and wherein the first network node determines the translation specifications on the basis of a frequency band or an operating numerology used for communicating with the second network node.

According to an aspect, there is provided a method comprising: storing, in a memory by a first network node of a wireless network, a mapping database defining translation specifications between a first resource space and a second resource space, wherein the first resource space is based on at least a first sub-carrier spacing and the second resource space is based on at least a second sub-carrier spacing different from the first sub-carrier spacing; scheduling, by the first network node, communication resources to a second network node of the wireless network, wherein the scheduled communication resources are defined in the first resource space; transmitting, by the first network node to the second network node, a scheduling message defining the communication resources in the first resource space; translating, by the first network node, the communication resources of the first resource space into communication resources of the second resource space by using the mapping database; and communicating, by the first network node, a message with the second network node in communication resources of the second resource space.

In an embodiment, the first sub-carrier spacing is smaller than the second sub-carrier spacing.

In an embodiment, a time-frequency resource unit of the communication resources of the second resource space defines a larger bandwidth and a smaller time duration than a time-frequency resource unit of the communication resources of the first resource space.

In an embodiment, the communication resources of the first resource space and the communication resources of the second resource space consume the same amount of time-frequency resources.

In an embodiment, the message comprises a first signal and a second signal, the method comprising as performed by the first network node: performing said translating for the first signal but not for the second signal, communicating the first signal in the communication resources of the second resource space, and communicating the second signal in communication resources of the first resource space.

In an embodiment, the second signal is a reference signal.

In an embodiment, the first network node transmits the translation specifications to the second network node.

According to an aspect, there is provided a computer program product embodied on a computer-readable medium and comprising a computer program code readable by a computer, wherein the computer program code configures the computer to carry out a computer process comprising:

storing, in a memory of a first network node of a wireless network, a mapping database defining translation specifications between a first resource space and a second resource space, wherein the first resource space is based on at least a first sub-carrier spacing and the second resource space is based on at least a second sub-carrier spacing different from the first sub-carrier spacing; scheduling communication resources to a second network node of the wireless network, wherein the scheduled communication resources are defined in the first resource space; transmitting, to the second network node, a scheduling message defining the communication resources in the first resource space; translating the communication resources of the first resource space into communication resources of the second resource space by using the mapping database; and communicating a message with the second network node in communication resources of the second resource space. According to an aspect, there is provided a computer program product embodied on a computer-readable medium and comprising a computer program code readable by a computer, wherein the computer program code configures the computer to carry out a computer process comprising: storing, in a memory of a first network node, a mapping database defining translation specifications between a first resource space and a second resource space, wherein the first resource space is based on at least a first sub-carrier spacing and the second resource space is based on at least a second sub-carrier spacing different from the first sub-carrier spacing; receiving, from a second network node of the wireless network, a scheduling message defining communication resources in the first resource space; translating the communication resources of the first resource space into communication resources of the second resource space by using the mapping database; and communicating a message with the second network node in the communication resources of the second resource space.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
   at least one processor; and
   at least one memory including computer program code;
   the at least one memory and the computer program code configured, with the at least one processor, to cause the apparatus at least to:
   store a mapping database defining translation specifications between a first resource space and a second resource space, wherein the first resource space is based on at least a first sub-carrier spacing and the second resource space is based on at least a second sub-carrier spacing different from the first sub-carrier spacing;
   receive, from a network node of a wireless network, a scheduling message defining communication resources in the first resource space;
   translate the communication resources of the first resource space into communication resources of the second resource space by using the mapping database; and communicate a message with the network node in the communication resources of the second resource space.

2. The apparatus of claim 1, wherein the first sub-carrier spacing is smaller than the second sub-carrier spacing, and wherein a time-frequency resource unit in the communication resources of the second resource space defines a larger bandwidth and a smaller time duration than a time-frequency resource unit in the communication resources of the first resource space.

3. The apparatus of claim 1, wherein the communication resources of the first resource space and the communication resources of the second resource space consume the same amount of time-frequency resources.

4. The apparatus of claim 1, wherein the message comprises a first signal and a second signal, and wherein the at least one memory and the computer program code are configured, with the at least one processor, to cause the apparatus further to:
perform said translating for the first signal but not for the second signal,
communicate the first signal in the communication resources of the second resource space, and
communicate the second signal in communication resources of the first resource space.

5. The apparatus of claim 4, wherein the second signal is a control signal or a reference signal.

6. The apparatus of claim 4, wherein the first signal is a data signal.

7. The apparatus of claim 1, wherein the at least one memory and the computer program code are configured, with the at least one processor, to cause the apparatus further to:
receive, from the network node, at least one parameter indicating the translation specifications.

8. The apparatus of claim 1, wherein the translation specifications specify, for each time-frequency resource in the communication resources of the first resource space, a corresponding time-frequency resource in the second resource space.

9. The apparatus of claim 1, wherein the translation specifications specify how the communication resources of the second resource space form a different time-frequency pattern than the communication resources of the first resource space.

10. The apparatus of claim 1, wherein the at least one memory and the computer program code are configured, with the at least one processor, to cause the apparatus further to:
determine locations of demodulation reference signals in the second resource space on the basis of the scheduling message and the translation specifications.

11. The apparatus of claim 1, wherein the at least one memory and the computer program code are configured, with the at least one processor, to cause the apparatus further to:
determine a processing delay in the second resource space on the basis of the scheduling message and the translation specifications.

12. The apparatus of claim 11, wherein the processing delay comprises at least one of the following: a delay of a hybrid automatic repeat request, a scheduling delay and a minimum processing time for a transmitted signal or for a received signal.

13. The apparatus of claim 1, wherein the mapping database stores different translation specifications for different operative frequency bands or for different numerologies, and wherein the at least one memory and the computer program code are configured, with the at least one processor, to cause the apparatus further to:
determine the translation specifications on the basis of a frequency band or an operating numerology used for communicating with the network node.

14. An apparatus comprising:
at least one processor; and
at least one memory including computer program code;
the at least one memory and the computer program code configured, with the at least one processor, to cause the apparatus at least to:
store a mapping database defining translation specifications between a first resource space and a second resource space, wherein the first resource space is based on at least a first sub-carrier spacing and the second resource space is based on at least a second sub-carrier spacing different from the first sub-carrier spacing;
schedule communication resources to a network node of a wireless network, wherein the scheduled communication resources are defined in the first resource space;
transmit, to the network node, a scheduling message defining the communication resources in the first resource space;
translate the communication resources of the first resource space into communication resources of the second resource space by using the mapping database; and
communicate a message with the network node in communication resources of the second resource space.

15. The apparatus of claim 14, wherein the first sub-carrier spacing is smaller than the second sub-carrier spacing, and wherein a time-frequency resource unit of the communication resources of the second resource space defines a larger bandwidth and a smaller time duration than a time-frequency resource unit of the communication resources of the first resource space.

16. The apparatus of claim 14, wherein the communication resources of the first resource space and the communication resources of the second resource space consume the same amount of time-frequency resources.

17. The apparatus of claim 14, wherein the message comprises a first signal and a second signal, wherein the at least one memory and the computer program code are configured, with the at least one processor, to cause the apparatus further to:
perform said translating for the first signal but not for the second signal,
communicate the first signal in the communication resources of the second resource space, and
communicate the second signal in communication resources of the first resource space.

18. The apparatus of claim 17, wherein the second signal is a reference signal.

19. The apparatus of claim 14, wherein the at least one memory and the computer program code are configured, with the at least one processor, to cause the apparatus further to:
transmit the translation specifications to the network node.

20. A method comprising:
storing, in a memory by a first network node of a wireless network, a mapping database defining translation specifications between a first resource space and a second resource space, wherein the first resource space is based on at least a first sub-carrier spacing and the second resource space is based on at least a second sub-carrier spacing different from the first sub-carrier spacing;

receiving, by the first network node from a network node of the wireless network, a scheduling message defining communication resources in the first resource space;

translating, by the first network node, the communication resources of the first resource space into communication resources of the second resource space by using the mapping database; and communicating, by the first network node, a message with the network node in the communication resources of the second resource space.

* * * * *